United States Patent
Smith et al.

(10) Patent No.: US 9,065,588 B1
(45) Date of Patent: Jun. 23, 2015

(54) COMMUNICATIONS SYSTEM HAVING REMOTELY MANAGED AND CONFIGURED OPTICAL NETWORK UNIT

(75) Inventors: Brian C. Smith, Madison, AL (US); Daniel M. Joffe, Owens Crossroads, AL (US)

(73) Assignee: Adtran, Inc., Huntsville, AL (US)

(*) Notice: Subject to any disclaimer, the term of this patent is extended or adjusted under 35 U.S.C. 154(b) by 1146 days.

(21) Appl. No.: 12/983,448

(22) Filed: Jan. 3, 2011

(51) Int. Cl.
  *H04L 12/56* (2006.01)
  *H04J 14/02* (2006.01)
  *H04L 12/28* (2006.01)

(52) U.S. Cl.
  CPC .......... *H04J 14/0252* (2013.01); *H04L 12/2856* (2013.01); *H04L 12/2898* (2013.01)

(58) Field of Classification Search
  CPC ............. H04J 14/0252; H04L 12/2856; H04L 12/2898; H04Q 11/0067
  USPC ............ 370/463, 401, 244, 389, 466; 398/58, 398/115, 45, 214, 72; 399/80
  See application file for complete search history.

(56) References Cited

U.S. PATENT DOCUMENTS

| | | | | |
|---|---|---|---|---|
| 5,016,059 A * | 5/1991 | Smeiman | ........................ | 399/80 |
| 5,469,282 A | 11/1995 | Ishioka | ........................ | 359/110 |
| 5,664,002 A | 9/1997 | Skinner, Sr. | ................. | 379/56.2 |
| 5,864,415 A * | 1/1999 | Williams et al. | ................ | 398/72 |
| 6,038,310 A * | 3/2000 | Hollywood et al. | .......... | 379/283 |
| 6,567,195 B1 | 5/2003 | Ford et al. | ...................... | 359/118 |
| 6,626,586 B1 | 9/2003 | Jaeger | ................................ | 398/5 |
| 7,116,761 B2 | 10/2006 | Ashton et al. | ................. | 379/56.2 |
| 7,379,542 B2 | 5/2008 | Jackson | ................... | 379/102.04 |
| 7,596,801 B2 | 9/2009 | Wall et al. | ...................... | 725/129 |
| 7,672,591 B2 | 3/2010 | Soto et al. | ........................ | 398/72 |
| 2002/0163921 A1 * | 11/2002 | Ethridge et al. | .............. | 370/401 |
| 2004/0114525 A1 * | 6/2004 | Taylor et al. | ................... | 370/244 |
| 2004/0165614 A1 * | 8/2004 | Lee | ................ | 370/463 |
| 2005/0265386 A1 * | 12/2005 | Smith et al. | ................... | 370/466 |
| 2006/0083253 A1 * | 4/2006 | Park et al. | ...................... | 370/401 |
| 2007/0121619 A1 * | 5/2007 | Kimbrough et al. | .......... | 370/389 |
| 2008/0159744 A1 * | 7/2008 | Soto et al. | ...................... | 398/115 |
| 2008/0279105 A1 * | 11/2008 | Absillis et al. | ............. | 370/236.2 |
| 2009/0059933 A1 * | 3/2009 | Huang et al. | .................. | 370/401 |
| 2009/0060531 A1 * | 3/2009 | Biegert et al. | ................. | 398/214 |
| 2009/0232498 A1 * | 9/2009 | Tsuge et al. | ..................... | 398/58 |
| 2009/0310615 A1 * | 12/2009 | Bernard et al. | ............... | 370/401 |
| 2010/0150556 A1 * | 6/2010 | Soto et al. | ........................ | 398/66 |
| 2010/0196006 A1 * | 8/2010 | Lin et al. | .......................... | 398/58 |
| 2011/0069953 A1 * | 3/2011 | Bronstein et al. | .............. | 398/45 |

* cited by examiner

*Primary Examiner* — Andrew Lai
*Assistant Examiner* — Mahmudul Hasan
(74) *Attorney, Agent, or Firm* — Fish & Richardson P.C.

(57) ABSTRACT

An optical network unit includes a central office interface configured to connect to a central office local loop and customer premises and provide a central office source service. A switch and a switch device is connected to the switch and has at least one service port to provide a local source service. A relay switch is connected to the at least one service port and the central office interface. A processor is connected to the switch and relay switch and configured to receive a command message and in response switch into either the central office interface and provide the central office source service or switch into the service port and provide the local source service.

21 Claims, 4 Drawing Sheets

COMMUNICATIONS SYSTEM HAVING REMOTELY MANAGED AND CONFIGURED OPTICAL NETWORK UNIT

FIELD OF THE INVENTION

The present invention relates to communications systems, and more particularly, this invention relates to managing an Optical Network Unit (ONU).

BACKGROUND OF THE INVENTION

Service providers often spend considerable money to visit a customer premises such as at a customer's house and disconnect and connect various data services and customer premises equipment to local customers. This is known in the industry to those skilled in the art as the dreaded truck roll. Often, this could be obviated if there was some technique to remotely manage and configure remotely an ONU, such as from a central office management system. This would be especially applicable when using a reverse powered ONU and allowing the central office management system to send various management messages.

SUMMARY OF THE INVENTION

An optical network unit includes a central office interface configured to connect to a central office local loop and customer premises and provide a central office source service. A switch and a switch device is connected to the switch and has at least one service port to provide a local source service. A relay switch is connected to the at least one service port and the central office interface. A processor is connected to the switch and relay switch and configured to receive a command message and in response switch into either the central office interface and provide the central office source service or switch into the service port and provide the local source service.

In an example, the command message comprises a Simple Network Management Protocol (SNMP) message that is routed through the switch to the processor and in other examples the command message comprises a CLI (Call Level Interface) management message and in yet another example, a command message comprises an OMCI (Open Managed Client Instrumentation) management message.

In an example, the switch comprises an Ethernet switch and the command message is transmitted over an Ethernet operations and management layer protocol (ETHOAM) channel. The command message includes a VLAN tag identifier in another example. A memory is included in which the configuration of the relay switch is saved in case power is lost. The optical network unit is also configured to connect to at least one customer premises equipment and receive power therefrom.

A communications system is also set forth and includes a central office manager and central office local loop and the optical network unit connected thereto.

A method example is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
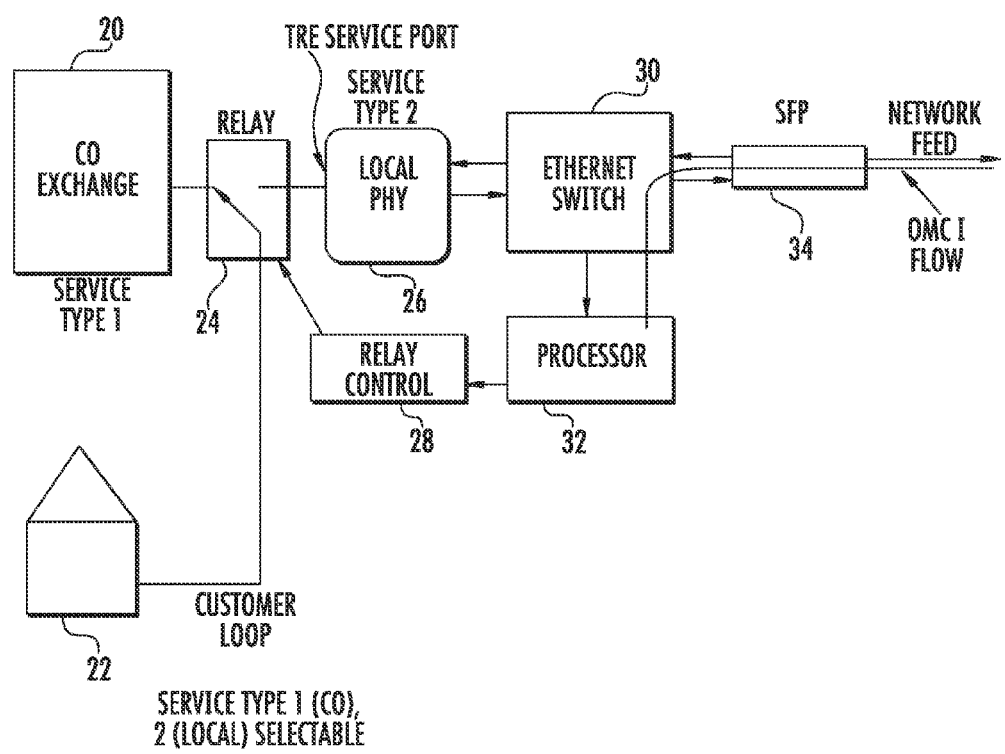
FIG. 1 is a block diagram of a communications system that includes the relay, relay control, central office exchange, and customer loop in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example, the system permits the disabling of service and switched service to a customer drop remotely without requiring a truck roll. The system uses a remotely managed switching element that resides in an ONU, which in this example is a reverse powered ONU. In accordance with a non-limiting example, it is possible to use management messages such as SNMP (Simple Network Management Protocol), OMCI (Open Managed Client Instrumentation), or CLI (Call Level Interface) management messages sent from a central office management system to configure the remotely managed switching element in the ONU.

Generally in a preferred embodiment, a remotely managed switching element is created in the FTTDP (fiber-to-the-distribution point) ONU and remotely configured by SNMP management messages or OMCI, CLI or similar command messages. Preferred elements and functions in a non-limiting example include a latching type switching relay that maintains its state without power being applied. Any relay control circuit is under processor control. A switch such as an Ethernet switch routes an SNMP set or CLI or OMCI command message as a relay message to a local processor on the FTTDP ONU over an Ethernet operations and management layer protocol (ETHOAM) message channel, using in one example a VLAN tag identifier. The system includes separate tip/ring port connections that connect to the latching type switching relay and connect the customer loop to a central office (CO) exchange port on a local Extended Reach Ethernet Service data service port (for example, the Total Reach Ethernet/TRE from ADTRAN, INC. of Huntsville, Ala.). Two central office services that could be provided can be any two-wire (or four-wire) type service served from the central office (CO) exchange. These services could include POTS, ADSL, VDSL, ADSL2, VDSL2, SHDSL, ISDN, HDSL4, and similar services. There could also be services from the local ONU device port (XDSL, VDSL2, ADSL2, POTS, Total Reach Ethernet (TRE) corresponding to an Extended Reach Ethernet Service, and similar services.

In one example, a message sent via the SNMP database via the ETHOAM flow selects the state of the relay on each port and is terminated and acted upon by a local processor. Service can be selected to a CO source service, a local TRE port service as a local source service, or disabled by connecting to the local TRE port source and taking the port out of service. In one example, it is possible to use a flash memory device on an ONU board that saves a provisioned relay state during a power failure. This system saves a service provider OPEX (operational expenditures) money by remotely changing customer service ports using a multipart interface at the FTTDP ONU and a managed switching relay element. The system controls dynamically the physical service port connectivity to a customer premise via a management interface. The system also maintains service port connection states during a power outage and saves latching relay switch states via flash memory storage of SNMP MIB data. It is possible that there is a remotely powered fiber optic device that performs servicing and operates as a smart relay and manages the service. As noted before, the ONU is remotely powered in an example.

FIG. 1 shows an overall block diagram view of the communications system, in accordance with a non-limiting example, and showing the central office (CO) exchange 20 as a service type 1 and connected to a customer loop 22 and selectable between the central office exchange and the customer loop using the relay 24. A service type 2 local physical device 26 is connected to the relay by an Extended Reach Ethernet Service port (a TRE service port) in a non-limiting example. A relay control 28 connects to the relay and the local physical device 26 connects to the switch 30, which in this example, is an Ethernet switch. A processor 32 connects to the relay control 28 and Ethernet switch 30 and interoperates with the relay control and the Ethernet switch, which in turn connects to a selectable fiber optic (SFP) module 34 and a network feed 36 for an optical media converter (OMC) data flow.

Figure 2:
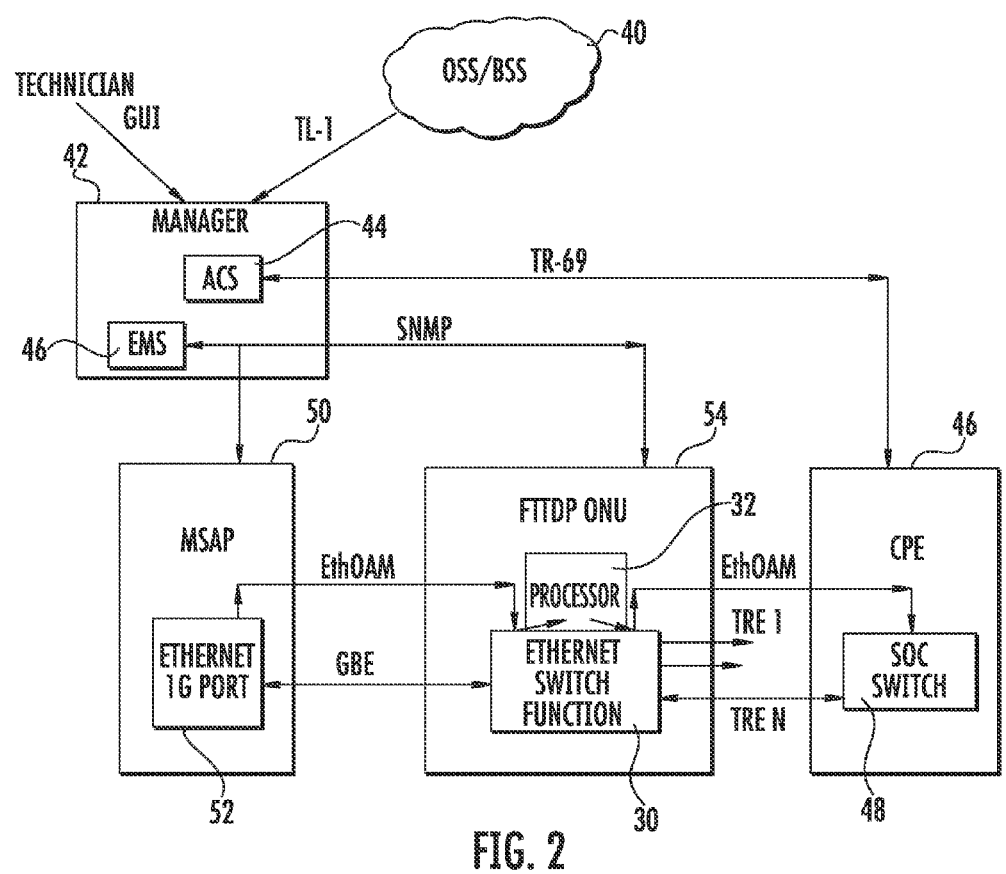
FIG. 2 is another block diagram example of a communications system similar to FIG. 1, but showing other details in accordance with a non-limiting example.

FIG. 2 shows a block diagram of a basic management model and network architecture. In this example, the illustrated Ethernet switch 30 and processor 32 are the same reference numerals in FIG. 1, otherwise the reference numerals for components shown in FIG. 2 begin in the 40's.

An Operation Support System/Business Support System (OSS/BSS) 40 connects to a central office manager 42 that includes an auto configuration server (ACS) 44 and element management system (EMS) 46 that manages network elements using SNMP. These components could be supplied from ADTRAN, INC. The ACS 44 communicates to at least one customer premises equipment 46 that includes a system-on-chip (SOC) switch 48. Only one CPE is illustrated, but the ONU typically connects to a plurality of CPE's. The EMS 46 communicates with a multi-service access and aggregation platform (MSAP) 50 that could be a Total Access 5000 device from ADTRAN, INC. and includes an Ethernet one gigabit (1G) port 52 that communicates over ETHOAM with the FTTDP ONU 54, which includes the Ethernet switch 30 and processor 32. The Ethernet 1G port 52 communicates using gigabit Ethernet (GBE) to the Ethernet switch. The OSS/BSS 40 communicates via a Transaction Language 1 (TL-1) protocol with the ACS 44 in one example. A technician 54 communicates with the central office manager 42 using a graphical user interface (GUI). The ACS communicates to a CPE in this example using TR-069 as an application layer protocol such as CPE WAN Management Protocol (CWMP).

Figure 3:
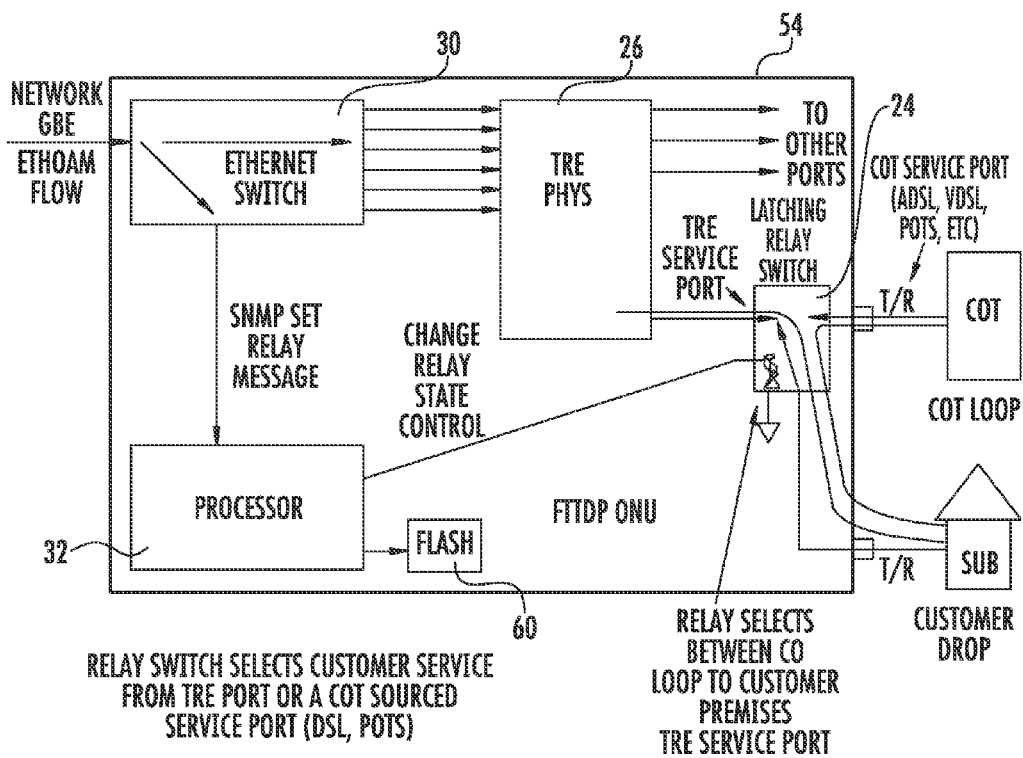
FIG. 3 is a schematic block diagram for a relay circuit in accordance with a non-limiting example.

Greater details of an example relay circuit schematic diagram are shown in FIG. 3. The relay switch 24 selects a customer service from the TRE port or a COT source service port such as DSL or POTS. As illustrated, the Ethernet switch 30 connects to the TRE physical device 26 and processor 32 that includes a flash memory 60. An SNMP set is sent as part of a relay message from the Ethernet switch 30 to the processor 32. The Ethernet switch receives network gigabit Ethernet (GEE) information through the ETHOAM flow. The TRE physical device 26 in this example connects to other ports and also connects to the TRE service port as part of the latching relay switch as illustrated. The relay elects between the central office loop to a customer premises or TRE service port as illustrated as the COT service port as the COT loop sub as part of the customer drop.

Figure 4:
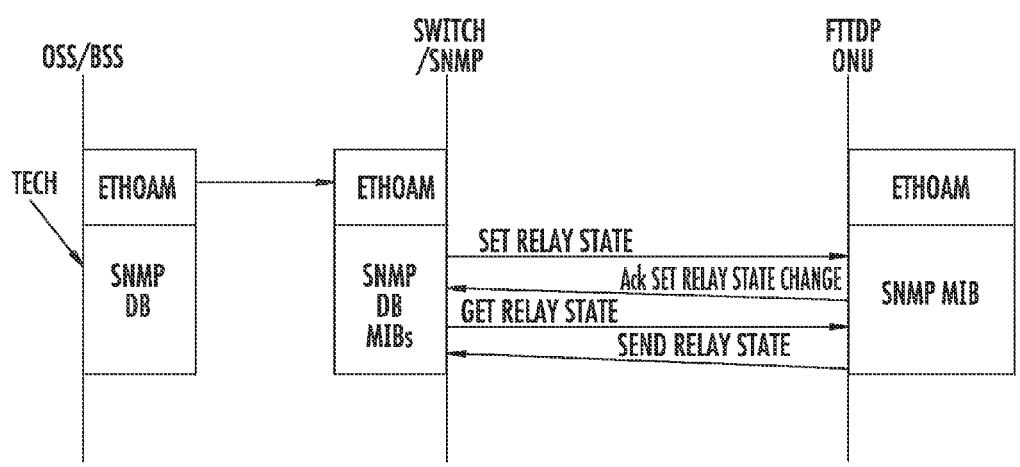
FIG. 4 is a message flow diagram in accordance with a non-limiting example.

FIG. 4 is a message flow diagram showing greater details of a message flow between basic elements of the OSS/BSS, the switch that operates with SNMP and the FTTDP ONU. Various components are illustrated in FIGS. 1-3. In one example, a technician enters a change to the service relay state via the GUI or CLI interface to the EMS system. The EMS system generates an SNMP set request message towards the FTTDP ONU using the SNMP management flow. The SNMP message is carried over the ETHOAM and delivered to the FTTDP ONU processor as a management packet. The FTTDP ONU processes the messages, updates the SNMP MIB state, and switches the service relay at the desired port. The FTTDP ONU updates the flash memory and the SNMP MIB table appropriately. The FTTDP ONU sends an ACK message back to the EMS system using an ETHOAM flow back to the EMS system.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical network unit, comprising:
   a central office interface configured to receive a physical connection to a first communications service loop for a first communications service;
   an Ethernet switch that is configured to receive a physical connection to a second communications service loop for a second communications service that is different from the first communications service;
   a relay switch connected between the central office interface, the Ethernet switch, and a customer loop that provides either the first communications service or the second communications service based on a position of the relay switch; and
   a processor connected between the Ethernet switch and the relay switch and configured to receive a command message through the Ethernet switch, and in response manipulate the position of the relay switch to couple the customer loop to one of the first communications service loop or the second communications service loop based on the command message.

2. The optical network unit according to claim 1, wherein said command message comprises a Simple Network Management Protocol (SNMP) message that is routed through the switch to the processor.

3. The optical network unit according to claim 1, wherein said command message comprises a CLI (Call Level Interface) management message that is routed through the switch to the processor.

4. The optical network unit according to claim 1, wherein said command message comprises an OMCI (Open Managed Client Instrumentation) management message that is routed through the switch to the processor.

5. The optical network unit according to claim 1, wherein said switch comprises an Ethernet switch.

6. The optical network unit according to claim 5, wherein said command message is transmitted over an Ethernet Operations and Management Layer Protocol (ETHOAM) channel.

7. The optical network unit according to claim 6, wherein said command message includes a VLAN tag identifier.

8. The optical network unit according to claim 1, and further comprising a memory into which the configuration of the relay switch is saved in case power is lost.

9. The optical network unit according to claim 1, wherein said optical network unit is configured to connect to at least one customer premises equipment and receive power therefrom.

10. A communications system, comprising:
   a central office manager;
   a central office local loop; and
   an optical network unit, comprising
      a central office interface connected to a first communications service loop and configured to receive a connection to a customer premises and provide a first communications service to the customer premises;
      an Ethernet switch that is configured to receive a physical connection to a second communications service loop for a second communications service that is different from the first communications service;
      a relay switch connected between the central office interface, the Ethernet switch, and a customer loop that provides either the first communications service or the second communications service based on a position of the relay switch; and
      a processor connected between the Ethernet switch and the relay switch and configured to receive a command message through the Ethernet switch, and in response manipulate the position of the relay switch to couple the customer loop to one of the first communications service loop or the second communications service loop based on the command message.

11. The communications system according to claim 10, wherein said command message comprises a Simple Network Management Protocol (SNMP) message that is routed through the switch to the processor.

12. The communications system according to claim 10, wherein said command message comprises a CLI (Call Level Interface) management message that is routed through the switch to the processor.

13. The communications system according to claim 12, wherein said command message comprises an OMCI (Open Managed Client Instrumentation) management message that is routed through the switch to the processor.

14. The communications system according to claim 10, wherein said switch comprises an Ethernet switch.

15. The communications system according to claim 14, wherein said command message is transmitted over an Ethernet Operations and Management Layer Protocol (ETHOAM) channel.

16. The communications system according to claim 15, wherein said command message includes a VLAN tag identifier.

17. The communications system according to claim 10, and further comprising a memory into which the configuration of the relay switch is saved in case power is lost.

18. The communications system according to claim 10, and further comprising at least one customer premises equipment and wherein said optical network unit is connected to at least one customer premises equipment and receives power therefrom.

19. A method of managing an optical network unit (ONU), comprising:
   providing a central office interface configured to receive a physical connection to a first communications service loop for a first communications service;
   providing an Ethernet switch that is configured to receive a physical connection to a second communications service loop for a second communications service that is different from the first communications service
   connecting a relay switch between the central office interface, the Ethernet switch, and a customer loop that provides either the first communications service or the second communications service based on a position of the relay switch; and
   receiving, by a processor connected between the Ethernet switch and the relay switch, a command message; and
   in response to receiving the command message, manipulating the position of the relay switch to couple the customer loop to one of the first communications service loop or the second communications service loop based on the command message.

20. The method according to claim 19, and further comprising transmitting the command message over an Ethernet Operations and Management Layer Protocol (ETHOAM) channel.

21. The method according to claim 19, and further comprising receiving power at the ONU from a customer premises.

* * * * *

UNITED STATES PATENT AND TRADEMARK OFFICE
CERTIFICATE OF CORRECTION

| | | |
|---|---|---|
| PATENT NO. | : 9,065,588 B1 | Page 1 of 1 |
| APPLICATION NO. | : 12/983448 | |
| DATED | : June 23, 2015 | |
| INVENTOR(S) | : Brian C. Smith and Daniel M. Joffe | |

It is certified that error appears in the above-identified patent and that said Letters Patent is hereby corrected as shown below:

In the Claims

In Column 6, In line 26 (approx.), In Claim 19, delete "service" and insert -- service; --, therefore Signed and Sealed this
Twelfth Day of April, 2016

Michelle K. Lee
*Director of the United States Patent and Trademark Office*